June 10, 1930.  L. E. LONG ET AL  1,762,694
MANUFACTURE OF BRAKE SHOES

Filed June 20, 1927

INVENTOR
LELAND E. LONG
STANLEY WHITWORTH
BY
M. W. McConkey
ATTORNEY

Patented June 10, 1930

1,762,694

UNITED STATES PATENT OFFICE

LELAND E. LONG AND STANLEY WHITWORTH, OF SOUTH BEND, INDIANA, ASSIGNORS TO BENDIX BRAKE COMPANY, OF CHICAGO, ILLINOIS, A CORPORATION OF ILLINOIS

MANUFACTURE OF BRAKE SHOES

Application filed June 20, 1927. Serial No. 199,989.

This invention relates to the manufacture of brake shoes and the like, and is described below as carried into effect in welding together a web and a rim to form an arcuate shoe which is T-shaped in a cross-section. An object of the invention is to provide a novel method and apparatus for forming an extremely strong joint between the web and rim, at a very high speed which will permit economical manufacture of the shoes in large quantities.

From one point of view, the invention comprises a novel method of manufacture, according to which the web is gripped or engaged by one electrode, preferably of an improved form hereinafter described and which embodies in itself substantial novelty, the rim being forced against the outer edge of the web by a second electrode while a current is passed between the electrodes.

Preferably the first electrode, with the web and rim, are moved past the second electrode angularly about the center of curvature of the shoe, and we prefer that the movement be intermittent and that the current be passed between the electrodes at each pause between successive steps of movement, thus forming in effect a series of equally-spaced spot-welds.

An important phase of the invention has to do with rabbeting or otherwise forming the electrode carrying the web, to leave a portion of the web projecting into engagement with the inner face of the rim, which portion is of a width approximately equal to the thickness of the rim. This insures that the welding action will be substantially the same as in welding together two sheets of equal thickness,—i. e. the heat is concentrated almost entirely at the joint where the weld is being made instead of distributing itself over either the rim or the web.

The above and many other advantages of the invention and features of novelty will be apparent from the following description of one method of manufacturing a shoe as illustrated in the accompanying drawing, in which.

Figure 1:
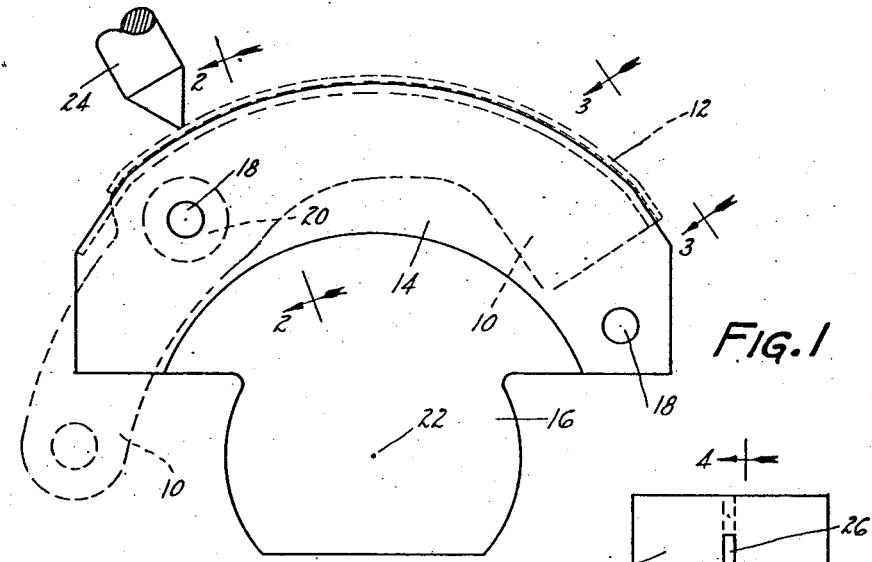
Figure 1 is a side elevation of the two electrodes, with the rim and web shown in dotted lines, in the positions they occupy when a weld is being made.
Figure 3:
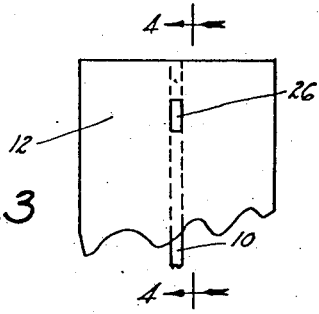
Figure 3 is a partial plan view of one end of the shoe, looking in the direction of the arrows 3—3 of Figure 1.
Figure 2:
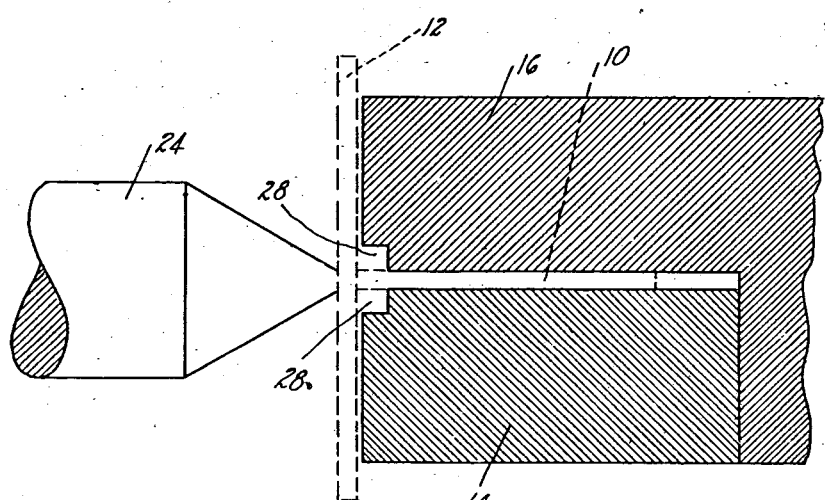
Figure 2 is a partial radial section through the electrodes on the line 2—2 of Figure 1.
Figure 4:
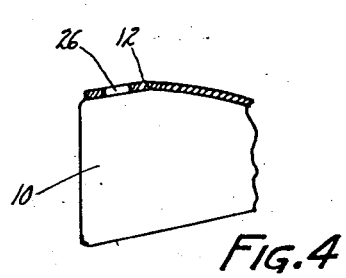
Figure 4 is a partial section through the shoe, on the line 4—4 of Figure 3.

In the arrangement illustrated, the shoe is built up by welding together a stiffening web 10 and a cylindrically-curved rim 12 to form an arcuate brake shoe which is T-shaped in cross-section. The outer edge of the web 10 engages the inner face of the rim 12. At the left end of the shoe in Figure 1, the web 10 is continued beyond the end of rim 12 to form a projecting anchor or pivot arm.

Preferably one of the electrodes comprises two parts 14 and 16, connected by guide pins 18 if desired. In this particular arrangement, one guide pin passes through an opening 20 in the brake shoe web. The part 14 is shown as fitting into a recess in part 16, with web 10 clamped between them. The entire electrode 14—16, with the rim and web, can be moved (either manually or mechanically) about the center 22 of curvature of the arcuate brake shoe.

Preferably the movement of the electrode, with the rim and web, is in a series of steps, and in the pauses between the successive steps a second electrode 24 is forced against the outer face of the rim 12 while a current is passed between the electrodes, thus forming in effect a series of equally-spaced spot-welds.

In order that the rim 12 may be mounted on the web 10, while the latter is held by the electrode 14—16, without being held by the operator, and also to locate the rim with respect to the web, we prefer to form web 10 with several (e. g. three) tongues 26 projecting from its outer edge into openings in the rim 12.

These tongues have, therefore, three principal functions: (1) They position the rim with respect to the web; (2) they hold the rim on the web before welding; and (3) in the finished shoe they take the shearing strain tending to separate the rim from the web by a lengthwise movement, so that there is no shearing action on the welds holding the rim and web together. It is not necessary that one of the spot-welds come at each tongue 26, although we prefer that this should be the case.

The outer faces of parts 14 and 16 of the electrode are curved to parallel closely the inner face of the rim 12, being close enough to aid materially in assembling the rim on the web, but leaving a sufficient air gap to prevent the passage of current. Each time the electrode 24 is forced against the rim during the passage of the current, during the pauses in the movement of electrode 14—16, it clamps the rim very firmly against the edge of the web, thus insuring a successful weld.

According to one important feature of the invention, parts 14 and 16 of the electrode are grooved or rabbeted at 28, at the junction of their outer faces with the surfaces engaging web 10; in such a manner that there is a portion of the web projecting into engagement with the inner face of the rim, which portion is approximately equal in width to the thickness of the rim 12.

This gives almost the same conditions as in welding together two sheets of equal thickness, which is usually considered the simplest condition in which to secure a successful weld, and serves to concentrate the heat right at the joint where the weld is being made instead of distributing any considerable amount of heat through either the rim or the web.

While one particular procedure, and one type of apparatus, has been described in detail, it is not my intention to limit the scope of the invention by that description, or otherwise than by the terms of the appended claims. Our applications Nos. 173,819, 209,229, 203,928, and 254,942, all owned by Bendix Brake Company, relate to this general subject-matter.

We claim:

1. That method of making articles such as brake shoes composed of a rim and a web which comprises assembling the rim and the web with the outer edge of the web seated against the inner face of the rim, engaging the web with an electrode at a position spaced from its outer edge a distance approximately equal to the thickness of the rim, engaging the outer face of the rim with another electrode, and passing a current between the electrodes.

2. That method of welding which comprises assembling a rim and a web with the outer edge of the web seated against the inner face of the rim, engaging the web with an electrode at a position spaced from its outer edge a distance approximately equal to the thickness of the rim, engaging the outer face of the rim with another electrode, and passing a current between the electrodes.

3. That method of making articles such as arcuate brake shoes composed of a rim and a web which comprises supporting and engaging the web with an electrode, engaging with another electrode the outer face of the rim assembled with its inner face resting against the outer edge of said web, passing a current between said electrodes, and moving the first electrode with the web and rim past the second electrode in a curved path.

4. That method of making articles such as arcuate brake shoes composed of a rim and a web which comprises supporting and engaging the web with an electrode, engaging with another electrode the outer face of the rim assembled with its inner face resting against the outer edge of said web, intermittently advancing the first electrode with the web and rim past the second electrode in a series of separate steps of angular movement about the center of curvature of said shoe and passing a current between said electrodes at each pause between successive steps.

5. That method of making articles such as arcuate brake shoes composed of a rim and a web which comprises mounting the web and the rim on an electrode, moving said electrode with the web and rim about the center of curvature of the shoe in a series of steps, and at each pause between successive steps forcing a second electrode against the outer face of the rim and passing a current between the electrodes.

6. Apparatus for making articles such as brake shoes composed of a rim and a web comprising a pair of electrode members adapted to clamp the web between them and curved on their outer faces to parallel the inner face of the rim engaging said web, the members being rabbeted at the junction of their outer faces with the surfaces engaging the web, in such a manner that there is a portion of said web projecting from between said members into engagement with the rim, said portion being of a width approximately equal to the thickness of the rim.

7. Apparatus for making articles such as brake shoes composed of a rim and a web comprising an electrode having parts adapted to engage opposite sides of the web and curved on their outer faces to parallel the inner face of the rim engaging said web, the parts being rabbeted at the junction of their outer faces with the surfaces engaging the web, in such a manner that there is a portion of said web projecting from between said parts into engagement with the rim, said portion being of a width approximately equal to the thickness of the rim.

8. That method of making arcuate articles such as brake shoes composed of a rim and a web which comprises supporting the curved web and the curved rim with an electrode engaging the web, bringing another electrode into engagement with the rim, moving one of the electrodes in a series of steps about the center of curvature of the article, and at each pause between successive steps passing a welding current between the electrodes.

9. That method of making articles such as brake shoes which comprises engaging the greater part of the web with an electrode, arranging a rim in engagement with said web, the limited portion of the outer periphery of said web remaining free of said electrode, arranging a second electrode for engagement with a relatively small area of the rim opposite said web and causing the second electrode to force said area firmly against the web, and passing a welding current between the electrodes while the said area is so pressed against the web.

In testimony whereof, we have hereunto signed our names.

STANLEY WHITWORTH.
LELAND E. LONG.